Sept. 25, 1928.

F. PARTOS

MAGAZINE PENCIL

Filed Jan. 23, 1928

1,685,374

INVENTOR
F. PARTOS,
BY
ATTY.

Patented Sept. 25, 1928.

1,685,374

UNITED STATES PATENT OFFICE.

FRANCIS PARTOS, OF LONDON, ENGLAND.

MAGAZINE PENCIL.

Application filed January 23, 1928, Serial No. 248,876, and in Great Britain February 1, 1927.

This invention relates to magazine pencils of the non-rotating kind in which the lead carriers are housed in the external casing of the pencil, the lead carriers being provided with lugs which project through slots in the casing and afford direct means whereby the various leads may be pushed forward or retracted as required.

In one form of magazine pencil of this type as heretofore proposed, the lead carriers have been loosely pivoted to bifurcated rods which have lugs projecting through the slots in the outer pencil casing. In another form the leads are each carried by a flexible metal strip, whose other end has a lug projecting through a slot in the outer pencil-casing. And in yet another form the lead carriers are held in writing position by means of racks on the slots in the outer pencil-casing with which racks the lugs on the lead carriers engage, According to my invention, I provide inside the outer sloted casing, an inner tube so grooved that it is substantially cruciform in cross section. In these grooves the lead carriers are housed and guided, each carrier having a lug projecting through one of the slots in the outer casing. The lead carriers, at the front of the inner grooved tube, are inwardly stepped so that each lead, which is frictionally held in a tube secured to the forward end of its respective carrier, is approximately centrally in position behind the opening of the usual conical nose of the outer casing. A screw or other cap is used to close the rear end of the outer casing.

To hold the protruded lead in the writing position I secure a band round the forward end of the inner grooved tube so that the lead is held in the protruded position by the pressure between the said band and the lead carrier. To increase the pressure between the band and the lead carriers rubber and/or other packing is inserted between the band and the inner tube. Or alternatively I provide one side of each of the slots in the outer casing with a rack between the teeth of which the lugs on the lead carriers can be turned to hold the lead in the desired position.

If leads of different colours are used in the pencil, means are provided for identifying the lead it is desired to use. For instance, the lugs on the lead carriers may be coloured, or the band round the forward end of the inner tube may be suitably coloured, the colour showing through holes in the outer casing; or the lead carriers may themselves be coloured.

In the accompanying drawings:—

Figure 1:
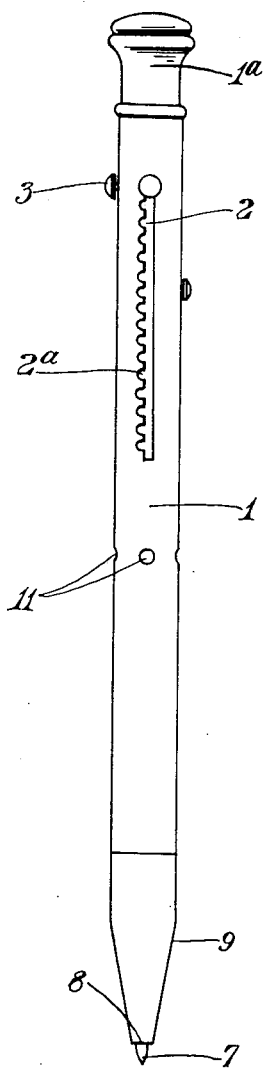
Fig. 1 is an elevation of a pencil made in accordance with one form of my invention.

In these drawings 1 is the outer casing having slots 2 therein and closed by the cap 1ª. Through the slots 2 project the lugs 3, each of which is secured to the rear end of a lead carrier 4, housed in a groove 5 of the inner tube 6. Each of the lead carriers 4 is inwardly offset as shown at 4ª so that the lead 7 at its forward end is approximately centrally disposed behind the orifice 8 of the nose 9 of the casing 1.

Figure 2:
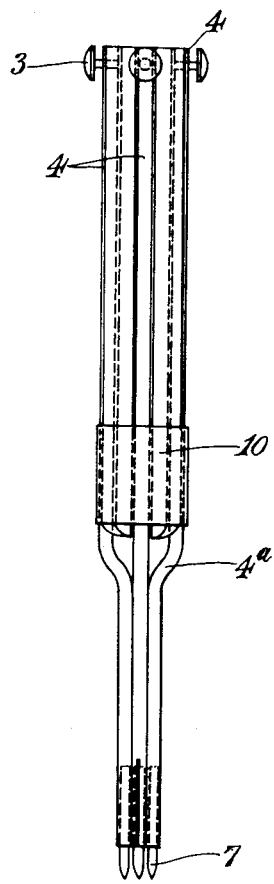
Fig. 2 is an elevation of the interior mechanism of a pencil made in accordance with another form of my invention, the outer casing and cap being removed.
Figure 3:
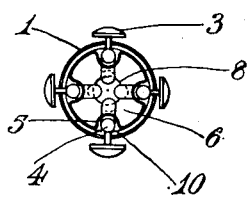
Fig. 3 is a plan view of Fig. 1 with the cap removed.

In Fig. 2 is shown one means for maintaining the lead in the protruded position. This consists of the band 10 secured around the forward end of the inner tube 6. The band is slightly smaller than the inner tube 6 so that the pressure between them is such as to constrict the forward ends of the grooves 5 thereby gripping the lead carriers 4 and maintaining each lead in extruded position when writing.

An alternative means for holding the lead in the forward position is shown in Fig. 1. In this form one side of each slot 2 in the outer casing 1 is provided with a rack as shown at 2ª. To maintain the lead in any desired position, the lead carrier is pushed to the required position, and the lug 3 turned into the rack 2ª, thus locking the lead carrier 4 against further longitudinal movement until the lug is released. If desired, both of the above described means for holding the lead in the protruded position may be combined in one pencil.

In order to identify the lead to be used, the band 10 may be coloured on the part opposite each lead. These colours will show through holes 11 in the outer casing 1, thus indicating the colour of the lead behind the hole. Alternatively either the lugs 3 or the lead carriers 4 may be appropriately coloured.

The interior of the inner tube 6 can be used as a magazine for spare leads.

I claim:—

A magazine pencil comprising an outer longitudinally slotted casing, an externally grooved inner tube adapted to serve as a magazine for spare leads, lead carriers slidably mounted in said grooves and inwardly offset at their forward ends, a lug mounted on the rear end of each lead carrier and projecting through one of the slots in the outer casing for projecting and retracting the same, a combined reinforcing and colour band disposed about said lead carriers, and said outer casing having spaced openings formed through its wall whereby the colour of the band may be viewed.

In testimony whereof I have hereunto set my hand, this seventh day of January, 1928.

FRANCIS PARTOS.